(12) United States Patent
Barter et al.

(10) Patent No.: US 8,859,122 B2
(45) Date of Patent: Oct. 14, 2014

(54) INTERCONNECT DEVICE FOR BATTERY ASSEMBLY

(75) Inventors: Stuart D. Barter, Lima, NY (US); Michael F. Zawisa, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 706 days.

(21) Appl. No.: 12/727,667

(22) Filed: Mar. 19, 2010

(65) Prior Publication Data

US 2011/0229745 A1  Sep. 22, 2011

(51) Int. Cl.
*H01M 2/20* (2006.01)
*H01M 10/48* (2006.01)

(52) U.S. Cl.
CPC ........... *H01M 2/206* (2013.01); *Y02E 60/12* (2013.01); *H01M 10/486* (2013.01)
USPC .......................................................... 429/90

(58) Field of Classification Search
USPC .......................................................... 429/90
See application file for complete search history.

(56) References Cited

U.S. PATENT DOCUMENTS

| | | | |
|---|---|---|---|
| 6,935,020 B2 | 8/2005 | Ikeda | |
| 2008/0118826 A1* | 5/2008 | Shimamura et al. | 429/129 |
| 2009/0297892 A1* | 12/2009 | Ijaz et al. | 429/7 |
| 2010/0285340 A1* | 11/2010 | Matsunaga | 429/90 |

* cited by examiner

*Primary Examiner* — Ula C Ruddock
*Assistant Examiner* — Jacob Marks
(74) *Attorney, Agent, or Firm* — Fraser Clemens Martin & Miller LLC; J. Douglas Miller

(57) ABSTRACT

An interconnect device for a battery assembly having a plurality of battery cell assemblies and a thermistor is disclosed. The interconnect device includes a non-conductive frame; a plurality of conductive traces integrally formed with the frame, a busbar in electrical communication with at least one of the conductive traces and disposed adjacent an aperture formed in the frame, wherein the aperture receives a tab of at least one of the battery cell assemblies, and a conductive pad disposed on a lower surface of the frame, the pad in electrical communication with at least one of the conductive traces and adapted to receive a signal from the thermistor.

20 Claims, 5 Drawing Sheets

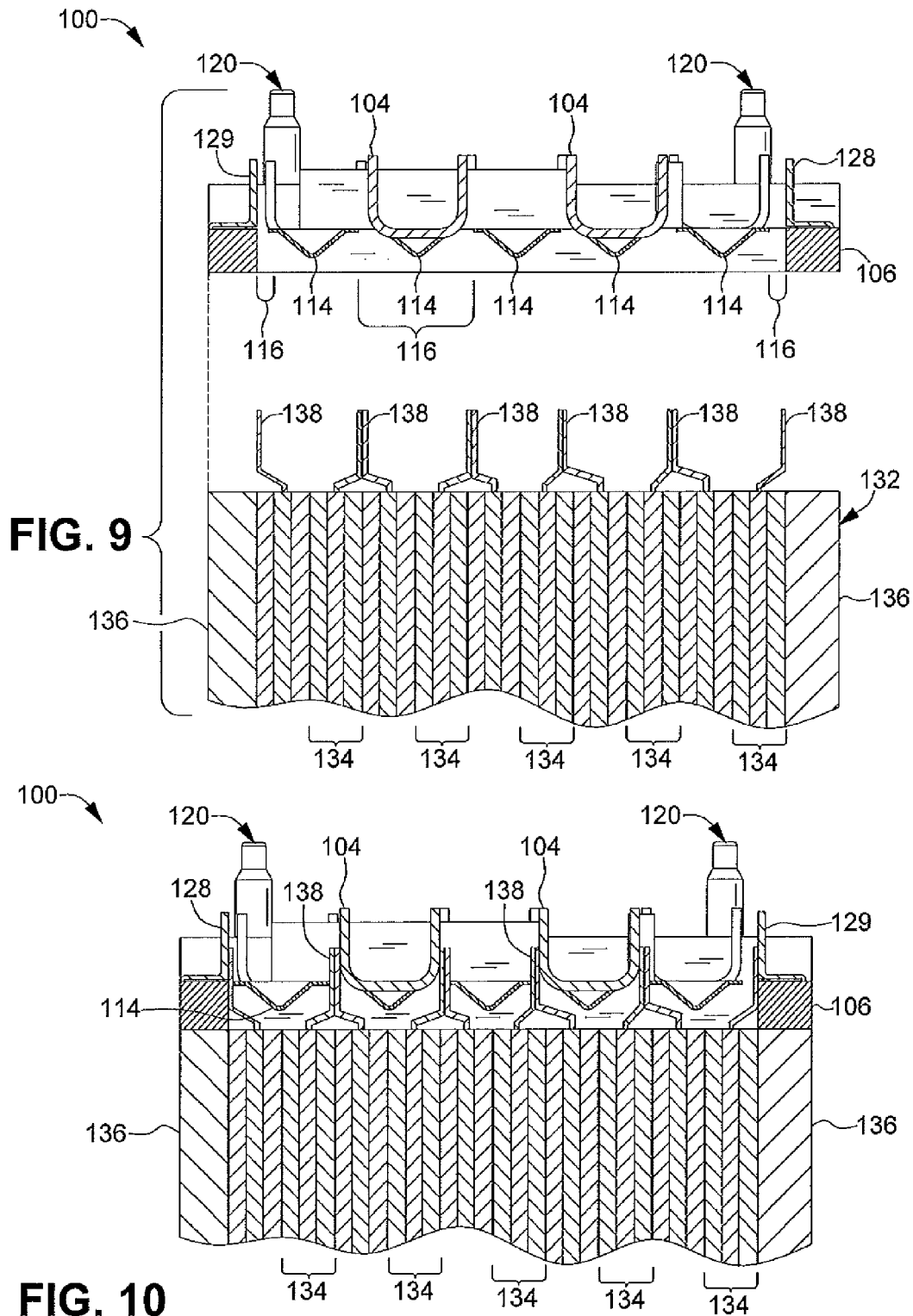

INTERCONNECT DEVICE FOR BATTERY ASSEMBLY

FIELD OF THE INVENTION

The present invention relates generally to a battery assembly. In particular, the invention is directed to an interconnect board for a battery assembly including a thermistor signal interface disposed between the battery assembly and the interconnect device.

BACKGROUND OF THE INVENTION

A number of applications (e.g., electric vehicle or stationary power sources) require a plurality of battery cell assemblies bundled together into a battery assembly to provide a specified amount of electric power.

In certain manufacturing processes, terminals (i.e. tabs) on the battery cell assemblies are bent toward each other and then mechanically fastened together utilizing a mechanical fastener. A problem associated with this methodology is that the terminals are not mechanically supported which can cause the electrodes to bend and degrade.

In other manufacturing processes, the terminals of the battery cell assemblies are electrically connected to each other (i.e., in electrical series or parallel) by means of a plurality of interconnect devices or boards.

However, conventional interconnect devices typically include several separate components (e.g. a plastic frame, a circuit board, a copper busbar) that require a number of independent manufacturing processes to form the final interconnect device. Additionally, conventional interconnect devices require side and top welds using non-standard weld tips to secure the interconnect device to the battery assembly. Alignment of the interconnect device with the battery assembly typically includes three degrees of freedom, thereby complicating the alignment process.

Conventional interconnect devices also include a thermistor signal interface to provide an electrical interface with a thermistor integrated with the battery assembly. However, the thermistor signal interface is typically unenclosed and prone to damage during an assembly process.

It would be desirable to develop an interconnect device for a battery assembly including a simplified structure to aide assembly, wherein after assembly, a substantial portion of a thermistor signal interface of the battery assembly is enclosed.

SUMMARY OF THE INVENTION

Concordant and consistent with the present invention, an interconnect device for a battery assembly including a simplified structure to aide assembly, wherein after assembly, a substantial portion of a thermistor signal interface of the battery assembly is enclosed, has surprisingly been discovered.

In one embodiment, an interconnect device for a battery assembly having a plurality of battery cell assemblies and a thermistor comprises: a non-conductive frame; a plurality of conductive traces integrally formed with the frame; a busbar in electrical communication with at least one of the conductive traces and disposed adjacent an aperture formed in the frame, wherein the aperture receives a tab of at least one of the battery cell assemblies; and a conductive pad disposed on a lower surface of the frame, the pad in electrical communication with at least one of the conductive traces and adapted to receive a signal from the thermistor.

In another embodiment, a battery module comprises: a battery assembly including a plurality of battery cell assemblies, wherein each of the battery cell assemblies has a pair of tabs extending therefrom; a thermistor disposed in the battery assembly to monitor a temperature of the battery assembly; a thermistor signal interface in electrical communication with the thermistor and disposed adjacent a periphery of the battery assembly; an interconnect device coupled to the battery assembly, the interconnect device including a non-conductive frame; a plurality of conductive traces integrally formed with the frame, a busbar in electrical communication with at least one of the conductive traces and disposed adjacent an aperture formed in the frame, wherein the aperture receives at least one of the tabs of at least one of the battery cells, and a conductive pad disposed on a lower surface of the frame, the pad in electrical communication with at least one of the conductive traces and adapted to contact the thermistor signal interface to receive a signal from the thermistor.

In yet another embodiment, a battery module comprises: a battery assembly including a plurality of battery cell assemblies disposed between a pair of end frames, wherein each of the battery cell assemblies has a pair of tabs extending therefrom; a thermistor disposed in the battery assembly to monitor a temperature of the battery assembly; a thermistor signal interface in electrical communication with the thermistor and disposed adjacent a periphery of the battery assembly, wherein the thermistor signal interface includes a leaf spring; an interconnect device coupled to the battery assembly, the interconnect device including a non-conductive frame; a plurality of conductive traces integrally formed with the frame, a busbar in electrical communication with at least one of the conductive traces and disposed adjacent an aperture formed in the frame, wherein the aperture receives at least one of the tabs of at least one of the battery cells, and a conductive pad disposed on a lower surface of the frame, the pad in electrical communication with at least one of the conductive traces and adapted to abut the leaf spring of the thermistor signal interface to receive a signal from the thermistor.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 9 is a partially exploded fragmentary cross-sectional view of the interconnect device and battery assembly of FIG. 6, taken along line 9-9; and FIG. 10 is a fragmentary cross-sectional view of the interconnect device and battery assembly of FIG. 6, taken along line 10-10.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
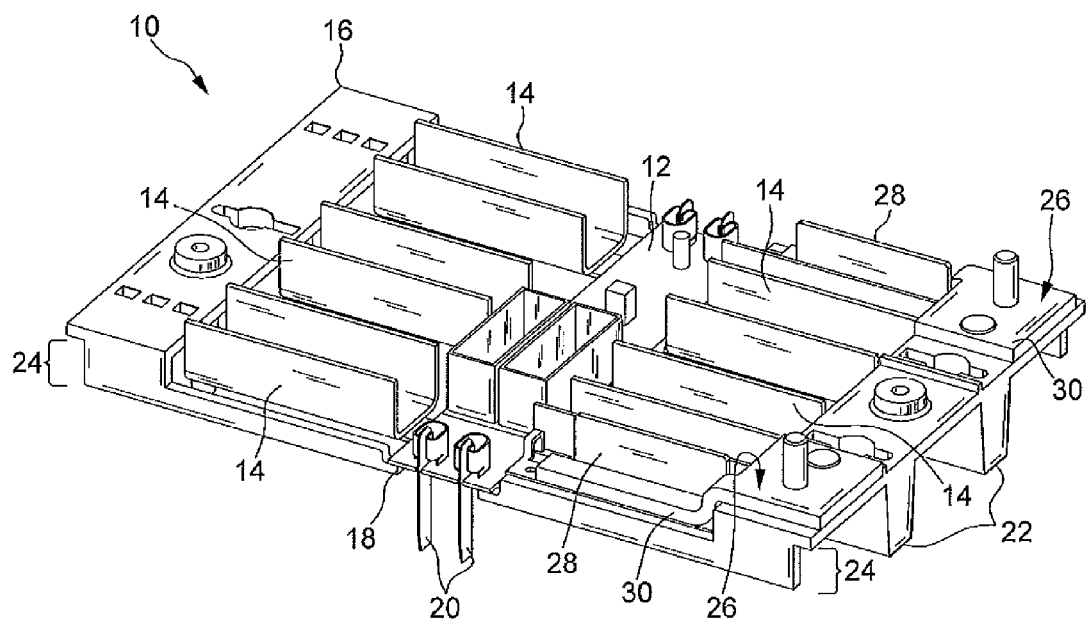
FIG. 1 is a front perspective view of an interconnect device according to the prior art.

FIG. 1 illustrates an interconnect device 10 for a battery assembly (not shown) according to the prior art. As shown, the interconnect device 10 includes a circuit board 12 in electrical communication with a plurality of copper busbar assemblies 14. Each of the circuit board 12 and the busbar assemblies 14 is coupled to a plastic frame 16. Typically, the circuit board 12 and the busbar assemblies 14 are manufactured using independent manufacturing processes and subsequently coupled to the frame 16 using a heat staking procedure. Soldering techniques are used to electrically couple the busbar assemblies 14 to pre-determined portions of the circuit board 12.

The circuit board 12 includes a thermistor signal interface 18 in signal communication with a thermistor (not shown) disposed in the battery assembly to monitor a temperature thereof. As shown, the thermistor signal interface 18 is mounted to a pre-determined portion of the circuit board 12 and in electrical communication therewith. The thermistor signal interface 18 includes a pair of elongate terminals 20 for interconnecting with a component of the battery assembly (e.g. female electrical connector) to receive a feedback signal from the thermistor relating to temperature and other thermal characteristics of the battery assembly.

The frame 16 includes risers 22 to space a portion of the frame 16 from the battery assembly when secured thereto. The frame 16 also includes a notched portion 24 formed therein to cooperate with posts (not shown) in an end frame of the battery assembly to facilitate an alignment therebetween.

Figure 2:
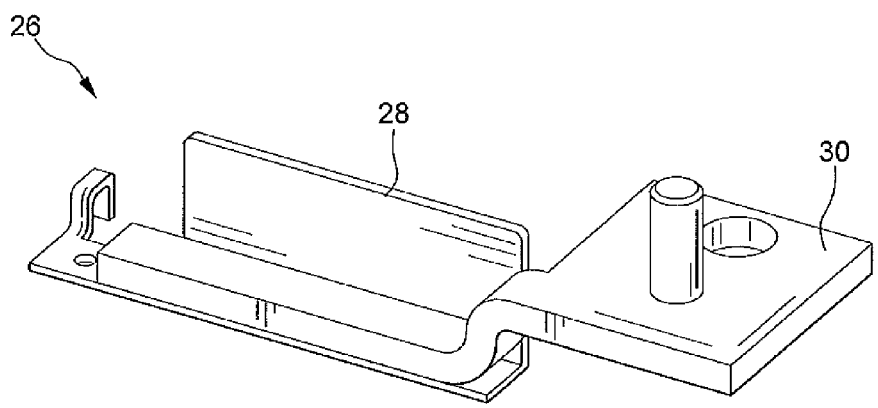
FIG. 2 is a front perspective view of a J-bar of the interconnect device of FIG. 1.

Due to a staggered configuration of the busbar assemblies 14, a plurality of J-bars 26 are coupled to the frame 16 to provide a conductive contact point for tabs of the battery cell assemblies of the battery assembly. As more clearly illustrated in FIG. 2, the J-bars 26 used in the prior art are two-piece components formed from a separate contact portion 28 and support portion 30.

Figure 3:
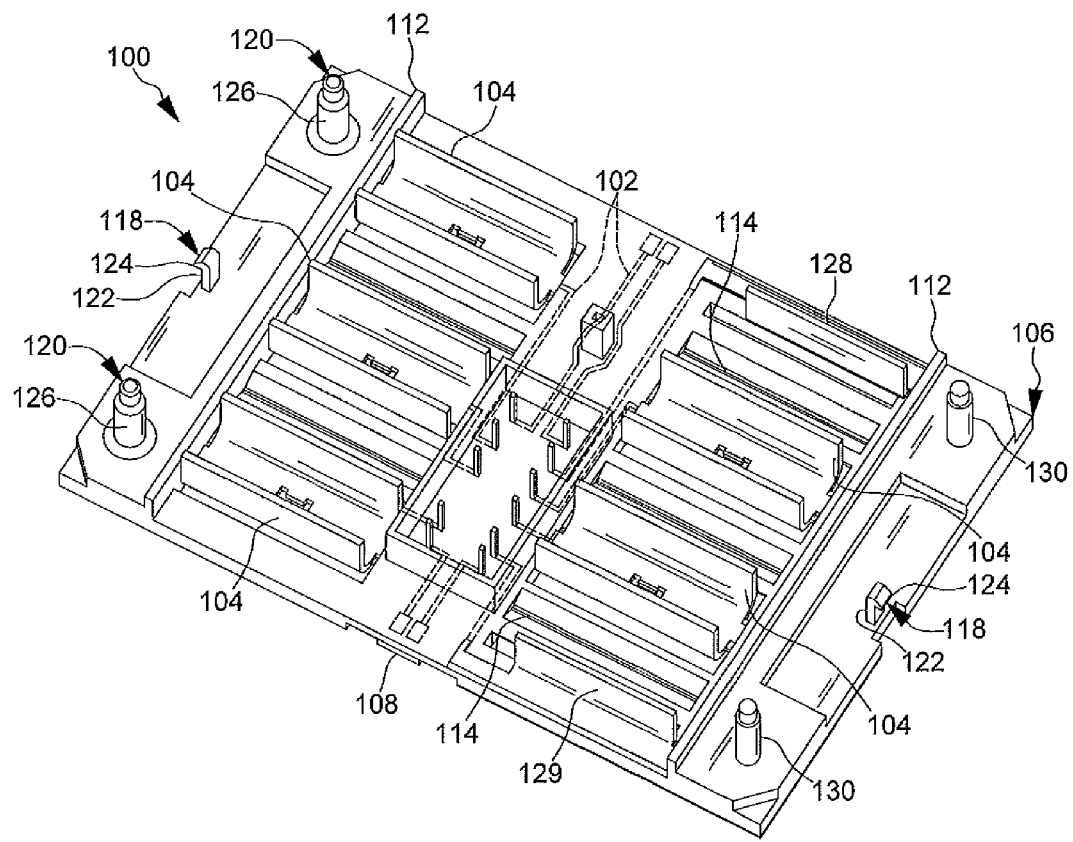
FIG. 3 is a side perspective view of an interconnect device according to an embodiment of the present invention.
Figure 4:
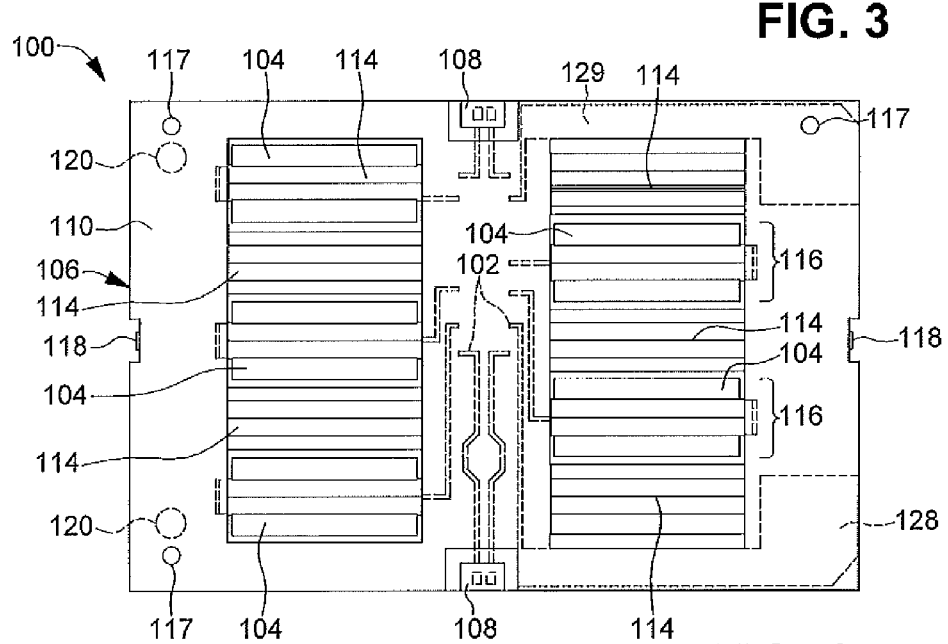
FIG. 4 is a bottom plan view of the interconnect device of FIG. 3.

FIGS. 3-4 illustrate an interconnect device 100 according to an embodiment of the present invention. As shown, the interconnect device 100 includes a plurality of electrical traces 102 in electrical communication with a plurality of substantially "U" shaped busbars 104. The traces 102 and busbars 104 are integrally molded with a frame portion 106 of the interconnect device 100. A conductive pad 108 is disposed on a lower surface 110 of the frame portion 106, wherein the pad 108 is in electrical communication with at least one of the electrical traces 102. As a non-limiting example, the interconnect device 100 including the traces 102, the busbars 104, and the pad 108, is formed using an insert molding process known in the art.

In certain embodiments, the traces 102 and busbars 104 are each formed from a conductive material and molded into a desired shape and configuration. The frame portion 106 is injection molded around pre-determined portions of the traces 102 and busbars 104 to provide electrical insulation and mechanical support. A continuous copper, as is known in the art, can also be molded over select portions of the traces 102 to ensure proper electrical interconnection.

The frame portion 106 includes a plurality of ribs 112 and a plurality of support sections 114 to provide rigidity and strength thereto. As shown, the support sections 114 have a generally triangular cross-section. However, any shape can be used. A plurality of apertures 116 are formed in the frame portion 106, wherein the busbars assemblies 104 are disposed adjacent thereto.

In certain embodiments the frame portion 106 includes a plurality of slots 117 formed in the lower surface 110 thereof, wherein each of the slots 117 receives an associated pin (not shown) disposed on a battery assembly to facilitate an alignment between the interconnect device 100 and the battery assembly.

The frame portion 106 also includes a pair of snap couplers 118 and a plurality of assembly studs 120. The snap couplers 118 include an elongate main body 122 having a lip 124 formed thereon for releaseably coupling a cover (not shown) thereto. The assembly studs 120 include an elongate main body 126 and are typically disposed in a standardized location (i.e. adjacent a corner) of the frame portion 106.

Figure 5:
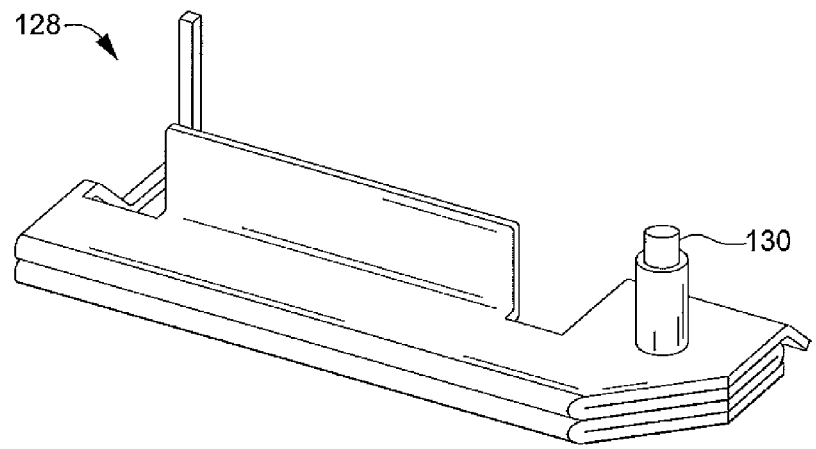
FIG. 5 is a side perspective view of a J-bar of the interconnect device of FIG. 3.

Due to a staggered configuration of the busbar assemblies 104, a plurality of J-bars 128, 129 are coupled to the frame portion 106, wherein a portion of each of the J-bars 128, 129 is disposed adjacent one of the apertures 116. As more clearly shown in FIG. 5, each of the J-bars 128, 129 is a unitary component formed from a folded metal. As a non-limiting example, each of the J-bars 128, 129 includes an elongate stud 130 similar to the assembly studs 120. However, it is understood that other conductive materials can be used. It is further understood that the in certain embodiments, the J-bars 128, 129 are formed from a plurality of components.

Figure 6:
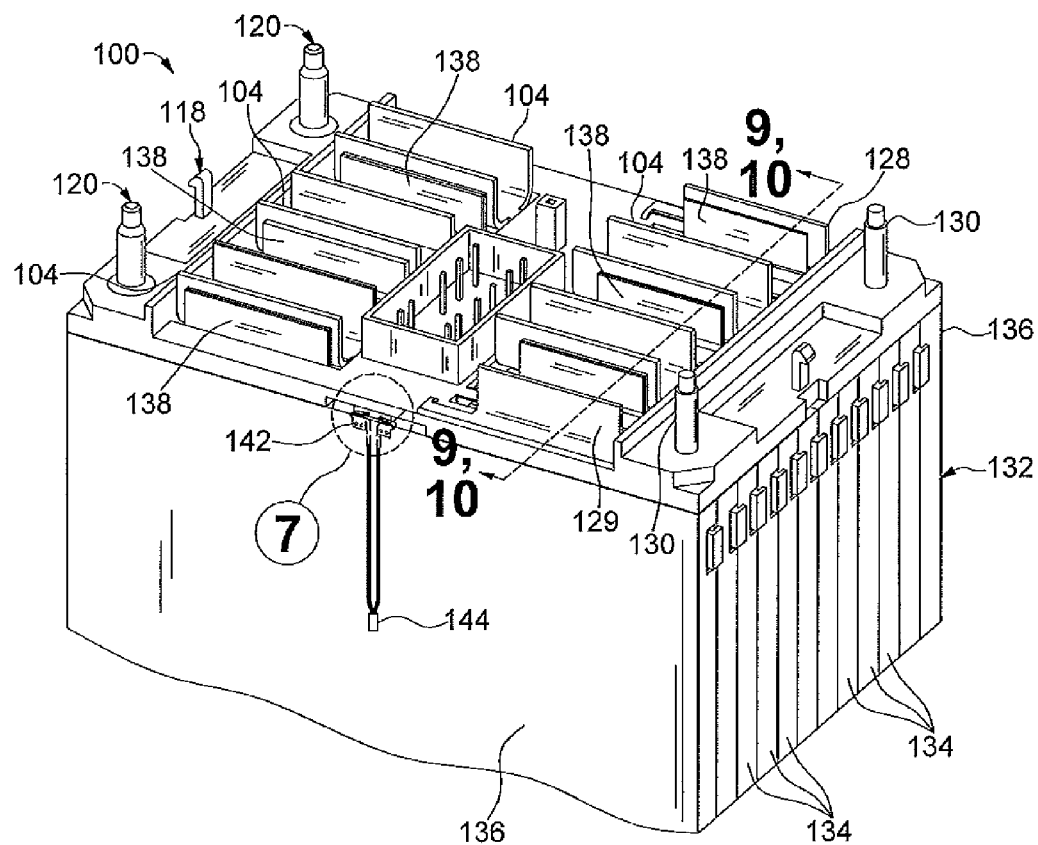
FIG. 6 is a side perspective view of the interconnect device of FIG. 3, showing the interconnect device coupled to a battery assembly.
Figure 7:
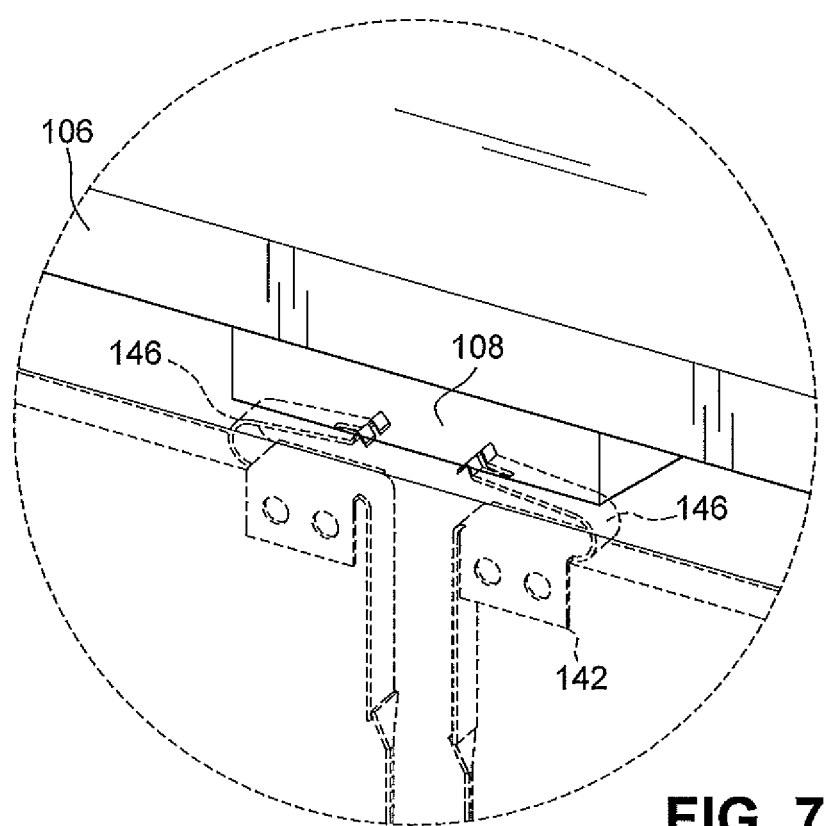
FIG. 7 is an enlarged fragmentary perspective view of the interconnect device and battery assembly of FIG. 6, showing a thermistor signal interface.
Figure 8:
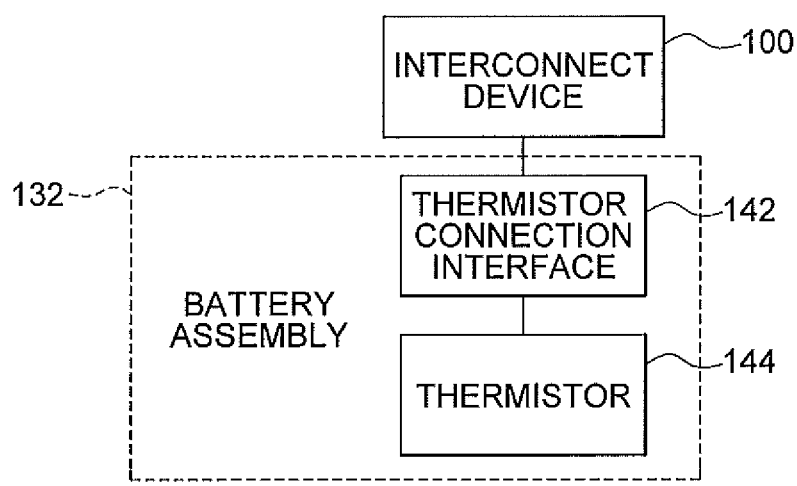
FIG. 8 is a schematic block representation showing an interconnection of the thermistor signal interface of FIG. 7.

FIGS. 6-8 illustrate the interconnect device 100 coupled to a battery assembly 132 having a plurality of battery cell assemblies 134 disposed between a pair of end frames 136. Each of the battery cell assemblies 134 has a pair of tabs 138 (i.e. terminals) extending therefrom. It is understood that the battery cell assemblies 134 can include a single battery cell or a plurality of battery cells.

In the embodiment shown, a thermistor signal interface 142 is coupled to at least one of the battery cell assemblies 134. The thermistor signal interface 142 is in electrical communication with a thermistor 144 disposed in the battery assembly 132. As a non-limiting example, the thermistor signal interface 142 is a leaf spring contact system. In the embodiment shown in FIG. 7, the thermistor signal interface 142 is a bifurcated leaf spring contact system having a pair of leaf spring members 146 for abutting the conductive pad 108 and providing signal communication between the thermistor 144 and the interconnect device 100. When the interconnect device 100 and the battery assembly 132 are aligned, the leaf spring members 146 of the thermistor signal interface 142 abut the conductive pad 108 of the interconnect device 100. As shown, one of the end frames 136 of the battery assembly 132 encloses a substantial portion of the thermistor signal interface 142 to protect the thermistor signal interface 142 from damage. It is understood that the thermistor signal interface 142 can have any shape and structural orientation to contact the conductive pad 108. It is further understood that any portion of the interconnect device 100 and battery assembly 132 can be used to shelter the thermistor signal interface 142 after assembly.

FIGS. 9-10 illustrate an assembly process for coupling the interconnect device 100 and the battery assembly 132. As a non-limiting example, the interconnect device 100 coupled to the battery assembly 132 is collectively referred to as a battery module. As shown, the tabs 138 of each of the battery cell assemblies 134 are arranged and aligned into pre-determined a configuration, as shown in FIG. 9. The interconnect device 100 is disposed on the battery assembly 132 and the pre-configured tabs 138 are disposed through the apertures 116 formed in the frame portion 106 of the interconnect device 100, as shown in FIG. 10. In certain embodiments, the interconnect device 100 is assembled with the battery assembly 132 along a single axis, without the need for multi-axis alignment procedures conventionally used in the art. The slots 117 formed in the lower surface 110 of the frame portion 106 each receive an associated portion (e.g. alignment pin) of the battery assembly 132 to facilitate an alignment between the interconnect device 100 and the battery assembly 132. As a non-limiting example, the interconnect device 100 is welded to the battery assembly 132 using an ultrasonic weld process. However, any means of coupling the interconnect device 100 to the battery assembly 132 can be used such as heat staking, for example. It is understood that the frame portion 106 can be welded to a portion (e.g. end frame 136) of the battery assembly 132 using a single-axis welding process. It is further understood that any number of battery modules can be disposed adjacent each other and coupled together using an assembly strap (not shown) to form a battery pack. As a non-limiting example, the assembly strap is a metal strap having a pair of the apertures formed therein to receive at least one of the assembly stud 120 and the elongate stud 130 of each of the interconnect devices 100 of adjacent battery assemblies.

The interconnect device 100 of the present invention provides a simplified low-profile design, wherein the thermistor signal interface 142 is substantially enclosed by the end frame 136 of the battery assembly 132 to protect the thermistor signal interface 142 from damage. The present invention requires only single-axis coupling procedures to assemble the interconnect device 100 with the battery assembly 132.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A interconnect device for a battery assembly having a plurality of battery cell assemblies and a thermistor, the interconnect device comprising:
a non-conductive frame;
a plurality of conductive traces integrally formed with the frame, at least a portion of each of the conductive traces entirely encased within the frame;
a busbar in electrical communication with at least one of the conductive traces and disposed adjacent an aperture formed in the frame, wherein the aperture receives a tab of at least one of the battery cell assemblies; and
a conductive pad disposed on a lower surface of the frame, the pad in electrical communication with at least one of the conductive traces and adapted to receive a signal from the thermistor.

2. The interconnect device according to claim 1, wherein the conductive traces are molded with the frame using an insert molding technique.

3. The interconnect device according to claim 1, wherein the busbar is molded with the frame using an insert molding technique.

4. The interconnect device according to claim 1, further comprising a J-bar integrally formed with the frame and disposed adjacent the aperture opposite the busbar.

5. The interconnect device according to claim 1, wherein the frame includes a plurality of slots formed in a lower surface thereof; wherein each of the slots receives an associated portion of the battery assembly to facilitate an alignment between the interconnect device and the battery assembly.

6. A battery module comprising:
a battery assembly including a plurality of battery cell assemblies, wherein each of the battery cell assemblies has a pair of tabs extending therefrom;
a thermistor disposed in the battery assembly to monitor a temperature of the battery assembly;
a thermistor signal interface in electrical communication with the thermistor and disposed adjacent a periphery of the battery assembly;
an interconnect device coupled to the battery assembly, the interconnect device including a non-conductive frame; a plurality of conductive traces integrally formed with the frame, at least a portion of each of the conductive traces entirely encased within the frame, a busbar in electrical communication with at least one of the conductive traces and disposed adjacent an aperture formed in the frame, wherein the aperture receives at least one of the tabs of at least one of the battery cells, and a conductive pad disposed on a lower surface of the frame, the pad in electrical communication with at least one of the conductive traces and adapted to contact the thermistor signal interface to receive a signal from the thermistor.

7. The battery module according to claim 6, wherein the thermistor signal interface is a leaf spring contact system.

8. The battery module according to claim 6, wherein the thermistor signal interface is a bifurcated leaf spring contact system.

9. The battery module according to claim 6, wherein the thermistor signal interface is substantially enclosed by the interconnect board and a portion of the battery assembly.

10. The battery module according to claim 6, wherein the conductive traces are molded with the frame using an insert molding technique.

11. The battery module according to claim 6, wherein the busbar is molded with the frame using an insert molding technique.

12. The battery module according to claim 6, further comprising a J-bar integrally formed with the frame and disposed adjacent the aperture opposite the busbar.

13. The battery module according to claim 6, wherein the frame coupled to a portion of the battery assembly using a single-axis coupling process.

14. The battery module according to claim 6, wherein the frame includes a plurality of slots formed in a lower surface thereof, wherein each of the slots receives an associated portion of the battery assembly to facilitate an alignment between the interconnect device and the battery assembly.

15. The battery module according to claim 6, wherein the frame of the interconnect device is welded to the battery assembly using an ultrasonic welding process.

16. A battery module comprising:
a battery assembly including a plurality of battery cell assemblies disposed between a pair of end frames, wherein each of the battery cell assemblies has a pair of tabs extending therefrom;
a thermistor disposed in the battery assembly to monitor a temperature of the battery assembly;
a thermistor signal interface in electrical communication with the thermistor and disposed adjacent a periphery of the battery assembly, wherein the thermistor signal interface includes a leaf spring; and an interconnect device coupled to the battery assembly, the interconnect device including a non-conductive frame; a plurality of conductive traces integrally formed with the frame, at least a portion of each of the conductive traces entirely encased within the frame, a busbar in electrical communication with at least one of the conductive traces and disposed adjacent an aperture formed in the frame, wherein the aperture receives at least one of the tabs of at least one of the battery cells, and a conductive pad disposed on a lower surface of the frame, the pad in electrical communication with at least one of the conductive traces and adapted to abut the leaf spring of the thermistor signal interface to receive a signal from the thermistor.

17. The battery module according to claim 16, wherein the leaf spring is a bifurcated leaf spring contact system.

18. The battery module according to claim 17, wherein the thermistor signal interface is substantially enclosed by the interconnect board and a portion of the battery assembly.

19. The battery module according to claim 17, further comprising a J-bar integrally formed with the frame and disposed adjacent the aperture opposite the busbar.

20. The battery module according to claim 17, wherein the frame coupled to a portion of the battery assembly using a single-axis coupling process.

\* \* \* \* \*